United States Patent [19]
Boland

[11] Patent Number: 5,517,629
[45] Date of Patent: May 14, 1996

[54] METHODS FOR ANALYZING COMPUTER PROGRAM PERFORMANCE

[76] Inventor: R. Nick K. Boland, 1402 Greenbrook Dr., Indianapolis, Ind. 46229

[21] Appl. No.: 380,220

[22] Filed: Jan. 30, 1995

Related U.S. Application Data

[63] Continuation of Ser. No. 935,594, Aug. 26, 1992, abandoned.

[51] Int. Cl.⁶ .................................................. G06F 9/00
[52] U.S. Cl. .................. 395/375; 364/261.3; 364/262.4; 364/DIG. 1
[58] Field of Search .................................. 395/800, 700, 395/575, 500, 375, 650

[56] References Cited

U.S. PATENT DOCUMENTS

| | | | |
|---|---|---|---|
| 4,924,383 | 5/1990 | Suzuki | 395/200 |
| 4,924,428 | 5/1990 | Vea | 395/375 |
| 4,937,780 | 6/1990 | Geyer et al. | 395/550 |
| 4,951,195 | 8/1990 | Fogg, Jr. et al. | 395/500 |
| 5,067,073 | 11/1991 | Andrews | 395/375 |
| 5,077,763 | 12/1991 | Gagnoud et al. | 377/16 |
| 5,167,023 | 11/1992 | de Nicolas et al. | 395/375 |
| 5,283,901 | 2/1994 | Masuyama | 395/700 |
| 5,347,647 | 9/1994 | Allt et al. | 395/575 |
| 5,353,419 | 10/1994 | Touch et al. | 395/375 |

OTHER PUBLICATIONS

K. Soule, "Algorithm for Tracing Execution Paths to a given Location in a Program", IBM Technical Disclosure Bulletin, vol. 14, No. 4, Sep. 1971, pp. 1016–1019.

*Primary Examiner*—Alyssa H. Bowler
*Assistant Examiner*—Alpesh M. Shah

[57] ABSTRACT

A method for analyzing program execution characteristics such as the minimum and maximum execution time, and maximum stack depth of a processor. The process examines every possible path through a program accumulating required information. The results guarantee best or worst case results since every path is examined. The time to produce these results is greatly reduced over other methods.

4 Claims, 5 Drawing Sheets

101 ~ IF (FIRST CONDITION) THEN
102 ~     FIRST PART OF CODE
103 ~ ENDIF
104 ~ IF (SECOND CONDITION) THEN
105 ~     SECOND PART OF CODE
106 ~ ENDIF

METHODS FOR ANALYZING COMPUTER PROGRAM PERFORMANCE

This application is a continuation of application Ser. No. 07/935,594, filed Aug. 26, 1992, now abandoned.

BACKGROUND

1. Field of Inventions

This invention relates to the analysis of execution time and stack depth for computers.

2. Description of Prior Art

It is beneficial in real-time programs to know execution characteristics such as the maximum execution time, minimum execution time, and worst case stack depth. This is one way to verify that a real-time program will finish all tasks within its time and memory constraints.

The flow of a simple program diverts from a linear flow of execution by the use of a conditional branch. A conditional branch has two paths of execution that it may take based on some logical test. The first direction is the path taken when the conditional branch falls through to the next instruction. The second direction is when the conditional branch takes the branch to another instruction that does not follow it.

A common method of measuring execution time and stack depth is to use a logic analyzer. This works well only if the program executions in a simple linear fashion. It becomes more complex if the timing depends upon calculations or inputs. The problem is to catch the program in its worst case path. There is no way of knowing what that path is. If the path is known then it is usually very difficult to have the program execute it.

The problem with this method and all other methods that measure the performance of a processor is that they can not guarantee worst case results. The execution time and stack depth are discovered using a trial-and-error approach. They hope that the random set of events that causes the worst case execution time and stack depth to occur will happen while being examined.

A program that only simulates a processor has a similar disadvantage. It does not try every possible combination of execution paths because that is impractical. A simulator may try a large number of paths, especially at the extremes, but that does not prove the worst case results will be found.

The number of paths in a program that uses conditional branches is between N+1 and $2^N$ where N is the number of conditional branches. A small program with 20 conditional branches would have between 21 and 1048576 possible separate paths through the program. It clearly becomes unrealistic to use conventional means to look at all of these paths to determine the worst case, especially in programs of significant size.

OBJECTS AND ADVANTAGES

Accordingly, several objects and advantages of my invention are:

(a) to provide a means of determining a computer program's slowest execution time;

(b) to provide a means of determining a computer program's fastest execution time;

(c) to provide a means of determining a computer program's largest stack depth usage; and (d) to provide this information in a deterministic way.

Further objects and advantages of my invention will become apparent from a consideration of the drawings and ensuing description.

DRAWING FIGURES

In the drawings, closely related figures have the same number but different alphabetic suffixes.

Figures 1A, 1B:
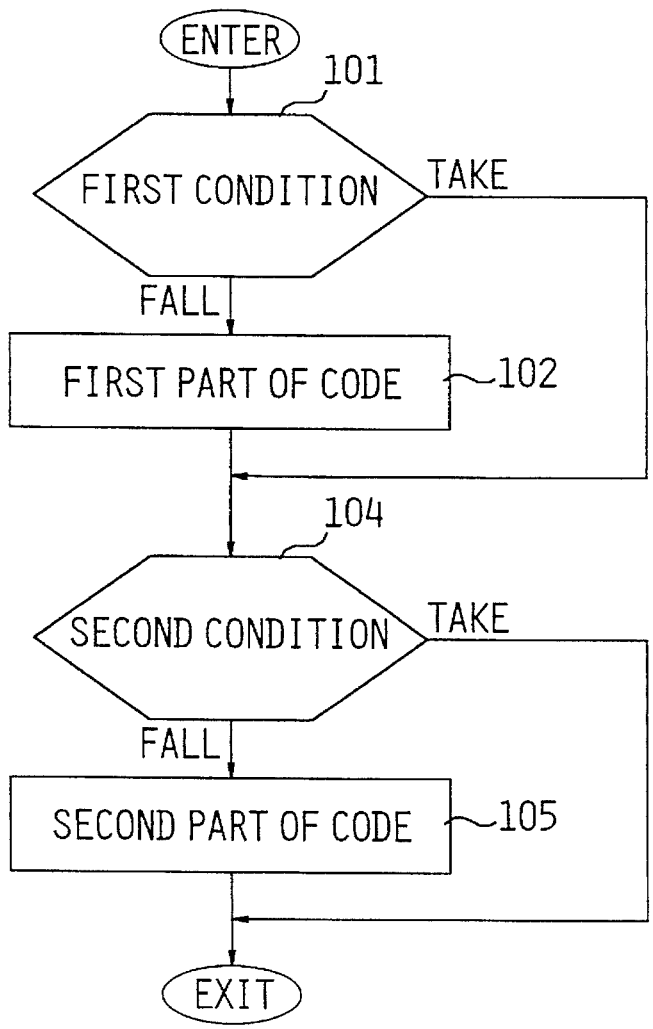
FIG. 1A to 1B show a simple program and a corresponding flowchart.

| Reference Numerals In Drawings | | | |
|---|---|---|---|
| 101 | first conditional statement | 102 | first part of code |
| 103 | first end of conditional statement | 104 | second conditional statement |
| 105 | second part of code | 106 | second end of conditional statement |
| 201 | first conditional node | 202 | first conditional fall path |
| 203 | first conditional take path | 204 | second conditional node |
| 205 | second conditional fall path | 206 | second conditional take path |
| 301 | variable initialization | 302 | test for conditional branch |
| 303 | nominal instruction information | 304 | test if conditional branch data complete |
| 305 | use previous information | 306 | analysis of take path |
| 307 | analysis of fall path | 308 | complete conditional branch data |
| 309 | add information to running totals | 300 | test if analysis should stop |
| 311 | increment instruction pointer | | |

DESCRIPTION OF THE PREFERRED EMBODIMENT

One embodiment of the present invention is now explained in detail with reference to the drawings.

FIG. 1A shows a simple program as an example. It contains a first conditional statement 101 and a second conditional statement 104. If first conditional statement 101 is true then execution falls through and a first part of code 102 executes; otherwise execution goes to a first end of conditional statement 103. If second conditional statement 104 is true then execution falls through and a second part of code 105 executes; otherwise execution goes to a second end of conditional statement 106.

FIG. 1B shows a flowchart of the program in FIG. 1A. The arrangement of conditional branches in the program in FIG. 1A produces the greatest number of possible paths that a program may have. This is calculated as $2^N$ where N is the number of conditional branches. The number of possible paths through the program in FIG. 1A is four.

Figure 2A:
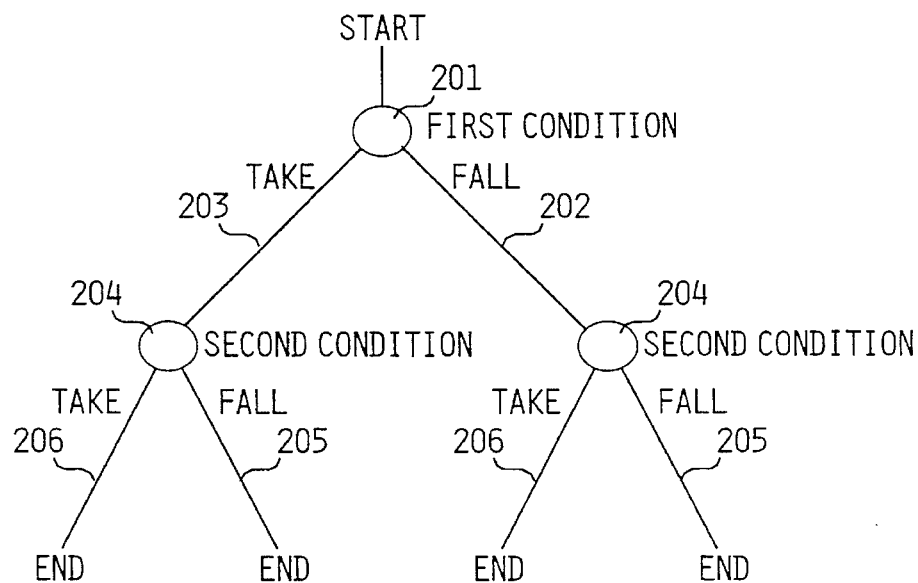
FIG. 2A to 2F show different views of a branch tree formed by the program in FIG. 1A.

FIG. 2A shows a tree structure diagram of all possible paths through the program in FIG. 1A. The first conditional branch 101 is represented by a node 201. A line segment 202 represents the information obtained when execution falls through the first conditional branch 101 to the first part of the code 102. The information obtained when the conditional branch 101 is taken to the conditional statement end 103 is represented by a line segment The second conditional branch 104 is represented by a node 204. A line segment 205 represents the information obtained when execution falls through the second conditional branch 104 to the second part of the code 105. The information obtained when the conditional branch 104 is taken to the conditional statement end 106 is represented by a line segment 206.

Figure 3:
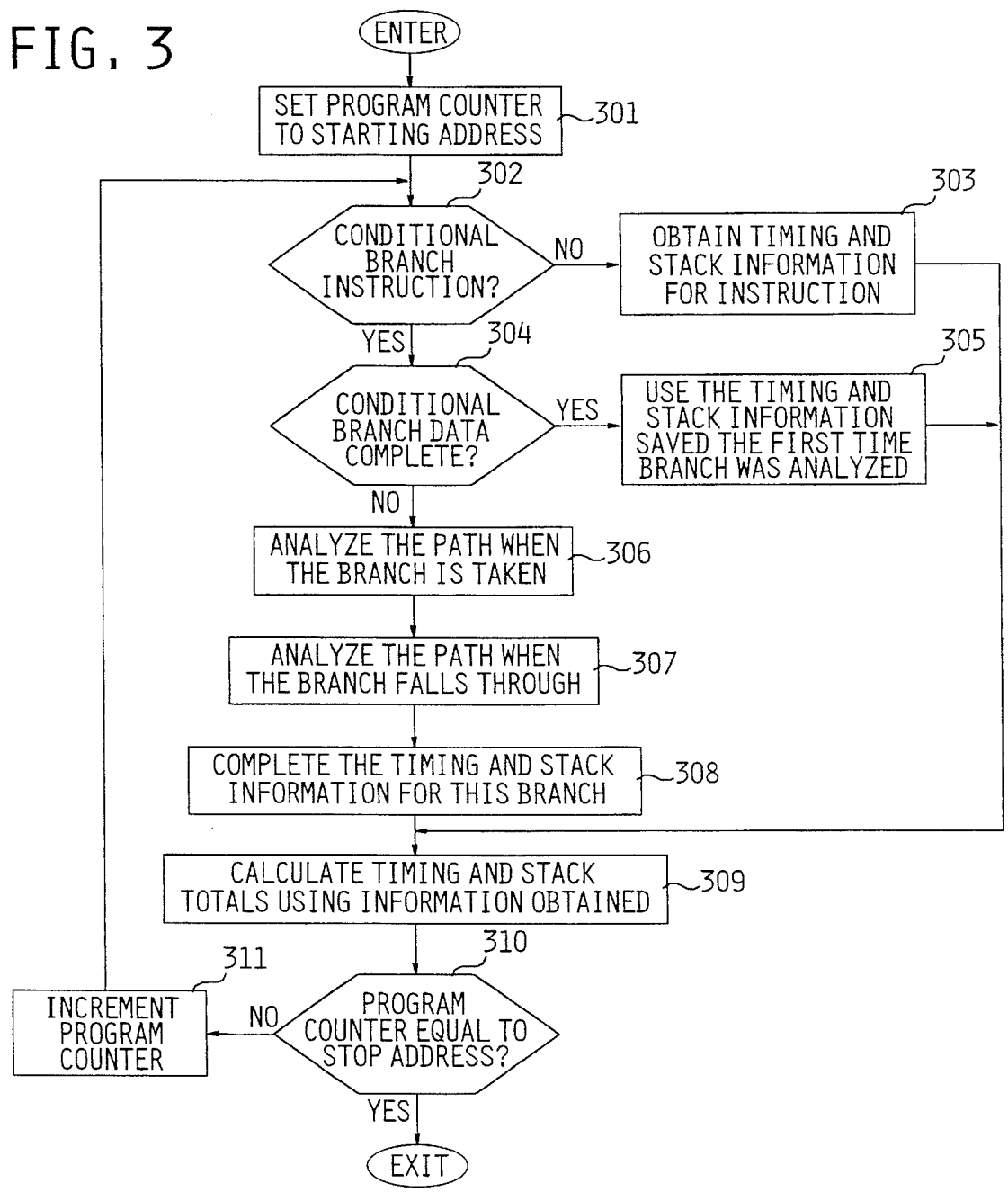
FIG. 3 shows a flow chart detailing the process of obtaining execution time and stack information from a computer program.

FIG. 3 shows a detailed flowchart for obtaining an analysis of execution information. A variable initialization 301 is performed to set a program counter. This program counter will contain the address of the first instruction to analyze.

A test for conditional branch 302 is performed on the current instruction. If the instruction is not a conditional branch instruction a normal information gathering 303 is done. This information is used by an add information to running totals 309 procedure.

If the opcode is a conditional branch instruction then a test if conditional branch data complete 304 is made. This is important because it allows the total number of paths searched to be greatly reduced. If the conditional branch instruction is completed a use previous information 305 is available. This contains analysis information relating to the conditional branch and everything following it. This is used to add information to running totals 309.

If the conditional branch is not complete then both of its paths must be analyzed. A analysis of take path 306 is arbitrarily shown first. One way to do this is by the use of a recursive call. The new starting address is the address to which the conditional branch will go on the take path. A analysis of fall path 307 is also done. A recursive call would set the new starting address to the address following the conditional branch.

Once both conditional branch paths are analyzed a complete conditional branch data 308 is done. This includes setting a flag and saving the information obtained about both paths associated with the conditional branch. The flag is use by the test if conditional branch data complete 304. The information is available for use previous information 305. The desired results of the analysis are used to add information to running totals 309.

A test if analysis should stop 310 is done. The current program counter is compared with the desired stop address. If the analysis is not done then an increment instruction pointer 311 is carried out and the algorithm starts over with test for conditional branch 302.

Figure 2B:
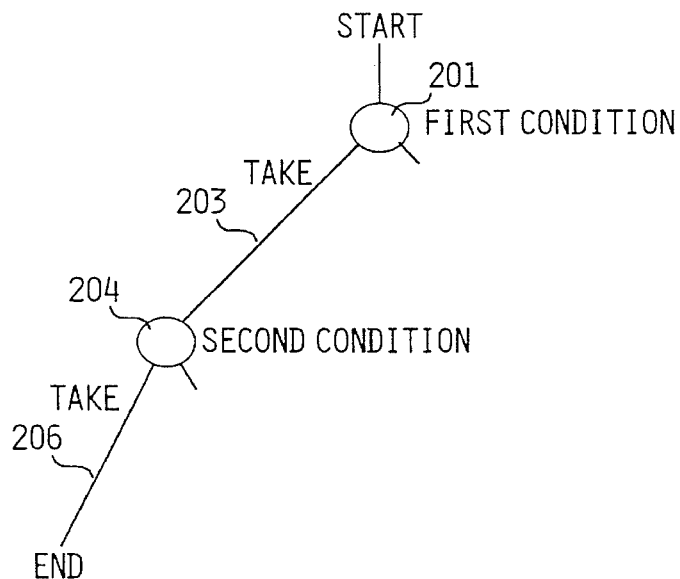
Figure 2C:
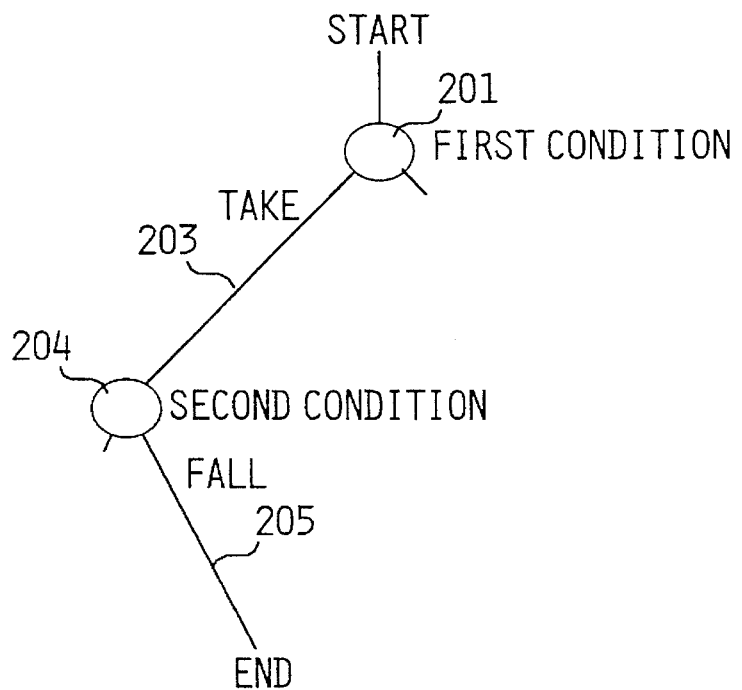
Figure 2D:
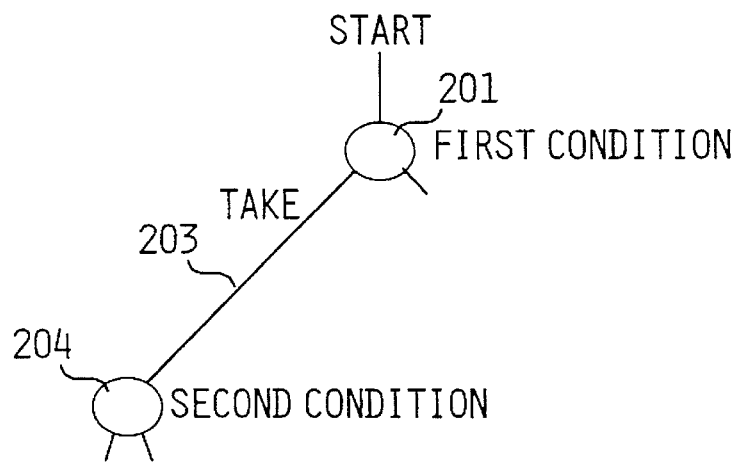

This process carried out on the program in FIG. 2A starts with FIG. 2B. The first conditional take path 203 is arbitrarily analyzed first. The second conditional take path 206 is also arbitrarily analyzed first. The analysis backs up in FIG. 2C and looks at the second conditional fall path 205. FIG. 2D shows that both paths of second conditional node 204 have been analyzed. The information associated with node 204 is saved and a flag set to indicate that the information is valid.

Figure 2E:
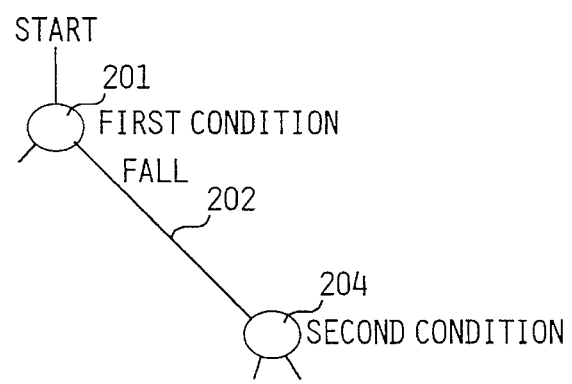
Figure 2F:
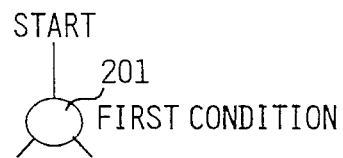

The analysis backs up in FIG. 2E and looks at the first conditional fall path 202. Node 204 is encountered again and the information for it is determined to be valid based on a flag associated with it. This information is used instead of repeating a complete analysis on both of its paths. FIG. 2F shows that both paths of first conditional node 201 have been analyzed. The information associated with node 201 is saved and a flag set to indicate that the information is valid.

SUMMARY, RAMIFICATIONS AND SCOPE

Thus the reader will see that the process of analyzing computer execution time and stack depth by this invention provides results in a deterministic and quick way. Furthermore, this method has the additional advantages in that each and every path of the program is analyzed;

it finishes much faster than processing paths that have already been processed once;

the maximum and minimum execution time may be calculated; and the maximum stack depth may be calculated.

Although the description above contains many specificities, these should not be construed as limiting the scope of the invention but as merely providing illustrations of some of the presently preferred embodiments of this invention. For example, other program execution instruction characteristics such as maximum interrupt suppression, time between instructions, possible stack imbalances, and current stack depth may be determined; wait states, pre-fetches, and other variables may be accounted for; loops may be handled by following the same path numerous times; branches may be forced in one direction by following only one of the two paths, etc.

Thus the scope of the invention should be determined by the appended claims and their legal equivalents, rather than by the examples given.

I claim:

1. A computer implemented process for analyzing computer program instruction characteristics in a data processing system, said data processing system executing a plurality of instructions, said instructions having instruction characteristics, said computer implemented process comprising the steps of:

(a) selecting an instruction for analysis;

(b) determining if instruction characteristics for instructions following the selected instruction are known;

(c) analyzing, if a result of said determining step is negative, said instructions following said selected instruction to determine instruction characteristics thereof;

(d) analyzing said selected instruction to determine instruction characteristics thereof; and (e) saving said instruction characteristics determined in steps (c) and (d);

wherein said instruction characteristics include execution time and the computer implemented process further comprises the steps of:

(f) repeating steps (a)–(e) until execution times for all branches of said plurality of instruction have been analyzed; and (g) using said saved execution times to determine at least one of a maximum execution time and a minimum execution time for said plurality of instruction.

2. The computer implemented process of claim 1, wherein said instruction characteristics include stack information.

3. A computer implemented process for analyzing computer program instruction execution time in a data processing system, said data processing system executing a plurality of instructions, said instructions having execution times, said computer implemented process comprising the steps of:

(a) setting a counter to a starting address;

(b) identifying an instruction at an address pointed to by said counter as a conditional branch instruction or another type of instruction;

(c) checking a flag, if said instruction is a conditional branch instruction, to determine if execution time information associated with instructions following the conditional branch instruction has been saved;

(d) analyzing, if a result of step (c) is negative, said instructions following said conditional branch instruction to obtain execution time information associated therewith;

(e) setting, after said analyzing step, said flag to indicate that said instructions following said conditional branch instruction have been evaluated;

(f) retrieving, if said result of step (c) is positive, execution time information associated with said instructions following said conditional branch instruction;

(g) analyzing, if said instruction is another type of instruction, said instruction to obtain execution time information associated therewith;

(h) saving said instruction execution time information which has been obtained by one of steps (d), (f) or (g);

(i) incrementing said counter;

(j) repeating steps (b)–(i) until an address in said counter is equal to a stop address; and (k) using said saved execution time information to determine at least one of a maximum execution time and a minimum execution time for said plurality of instructions.

4. A computer implemented process for analyzing computer program instruction stack information time in a data processing system, said data processing system executing a plurality of instructions, said instructions having execution times, said computer implemented process comprising the steps of:

(a) setting a counter to a starting address;

(b) identifying an instruction at an address pointed to by said counter as a conditional branch instruction or another type of instruction;

(c) checking a flag, if said instruction is a conditional branch instruction, to determine if stack information associated with instructions following the conditional branch instruction has been saved;

(d) analyzing, if a result of step (c) is negative, said instructions following said conditional branch instruction to obtain stack information associated therewith;

(e) setting, after said analyzing step, said flag to indicate that said instructions following said conditional branch instruction have been evaluated;

(f) retrieving, if said result of step (c) is positive, stack information associated with said instructions following said conditional branch instruction;

(g) analyzing, if said instruction is another type of instruction, said instruction to obtain stack information associated therewith;

(h) saving said instruction stack information which has been obtained by one of steps (d), (f) or (g);

(i) incrementing said counter;

(j) repeating steps (b)–(i) until an address in said counter is equal to a stop address; and (k) using said saved stack information to determine at least one of a maximum instruction stack and a minimum instruction stack for said plurality of instructions.

* * * * *